United States Patent Office 3,397,137
Patented Aug. 13, 1968

3,397,137
HYDROCARBON REFORMING PROCESS AND
CATALYST COMPOSITIONS THEREFOR
Paul E. Pickert, North Tonawanda, and Anthony P.
Bolton, Amherst, N.Y., assignors to Union Carbide Corporation, a corporation of New York
No Drawing. Continuation-in-part of application Ser. No. 472,653, July 16, 1965. This application May 15, 1967, Ser. No. 638,655
7 Claims. (Cl. 208—138)

ABSTRACT OF THE DISCLOSURE

Hydrocarbon reforming catalyst comprises zeolite X having a $SiO_2/Al_2O_3$ ratio of from 2.3 to 3, at least 92 percent of its aluminum ions balanced by metal cations of which at least 60 equivalent percent of the cations thereof being selected from calcium, manganese, barium or strontium or mixtures thereof, from 0.04 to 30 equivalent percent of the cations thereof being rare earth and having a Group VIII noble metal hydrogenation agent thereon. Preferably, the catalyst is also in admixture with an inorganic oxide diluent which is itself a hydrogenation catalyst or carries such an agent thereon.

Related applications

This is a continuation-in-part application of copending application Ser. No. 472,653, filed July 16, 1965, now abandoned.

The present invention relates in general to an improved process for reforming petroleum fractions to increase the octane number thereof. More particularly the invention relates to the use of a novel zeolitic catalyst composition in the process of reforming hydrocarbon mixtures and to the novel catalyst composition per se.

The reforming of petroleum hydrocarbon fractions such as naphthas is a well known operation which has been employed for some time throughout the petroleum industry. In general the purpose of the operation is to convert a relatively low octane rated hydrocarbon feed stock to hydrocarbon compositions of higher octane rating. The fractions to be reformed comprise, in the main, normal paraffins, paraffins having only a moderate degree of branching, and naphthenic hydrocarbons with small amounts of aromatic compounds. Since highly branched hydrocarbons and aromatic hydrocarbons have much higher octane ratings than their normal and naphthenic hydrocarbon counterparts, in reforming it is the principal object to isomerize and dehydrogenate the naphthenic hydrocarbons to form aromatics, to cyclize and dehydrogenate the straight chain paraffinic hydrocarbons to form aromatics, to isomerize the normal and slightly branched paraffins to more highly branched-chain paraffins and, with certain limits respecting quality and quantity, effect cracking.

Although to some degree the essential reforming reactions can be effected by purely thermal treatment, the results obtained using catalytic agents are so vastly superior that catalytic reforming is now almost universally employed.

As with catalysis in general, the catalytic reforming of hydrocarbon mixtures is still relatively empirical in nature insofar as the composition of the catalyst is concerned. Although hydrocarbon conversion catalysts of most widespread commercial use incorporate in some form alumina and/or silica, effectiveness has been found to be dependent on complex inter-relationships of a wide variety of variable factors such as the presence or absence of crystalline character, the pore size distribution of the catalyst composite, the particular type and relative proportion of metallic cations and the form in which these cations are incorporated into the catalyst complex.

Most recently the subject of intensive investigation as possible reforming catalysts are the natural and synthetic zeolitic crystalline aluminosilicates commonly termed zeolitic molecular sieves. As is now well known, zeolitic molecular sieves consist basically of a three-dimensional framework of $SiO_4$ and $AlO_4$ tetrahedra cross-linked by the sharing of oxygen atoms, the electro-valence of which is balanced by the presence of cations which in most instances can be exchanged for other cations without destruction of the crystal lattice. In addition the molecular sieves are characterized by having, in their activated state, interstitial cavities intercommunicating by virtue of pores of substantially uniform dimensions for a given zeolite species. These properties are all potentially advantageous in reforming catalysts but it has been found some must be augmented by non-zeolitic components and yet others must be minimized in order to achieve the desired hydrocarbon product. For example molecular sieves also possess properties which render them highly effective cracking catalysts, an activity which must be carefully controlled in a reforming process.

It is therefore the general object of the present invention to provide a novel zeolitic molecular sieve composition which has the ability to selectively catalyze all of the essential hydrocarbon reforming reactions, i.e. isomerization, aromatization, hydrogenation - dehydrogenation-dehydrogenation, cyclization and selective cracking, and to perform these functoins for long periods without significant decrease in activity.

It is a further object to provide a novel catalytic hydrocarbon reforming process using as the catalyst a zeolitic molecular sieve composition, which process is characterized by high yields of a hydrocarbon mixture having a high octane rating.

These and other and more particular objects which will be apparent from the specification hereinafter are accomplished by a reforming catalyst composition which comprises a crystalline zeolitic molecular sieve having a pore size large enough to accept benzene, a silicate to alumina ratio within the range of 2.3 to 3 inclusive and having at least about 92 percent of its aluminum ions balanced by cations of a metal of which at least 60 equivalent percent and preferably at least 75 equivalent percent, are calcium, barium, strontium or manganese or a mixture thereof, said zeolitic molecular sieve catalyst also containing a hydrogenation-dehydrogenation agent, particularly a metal of the Group VIII noble metals, i.e. the platinum-palladium group of metals.

The zeolitic molecular sieve catalyst composition defined immediately above also contains within its crystalline structure in addition to the calcium, barium, strontium or manganese cations, cations of one or more of thorium (atomic No. 90) and the rare earth metals having an atomic number of from 57 to 71 inclusive, said thorium and/or rare earth cations constituting at least 4, and preferably from 4 to 30, equivalent percent of the metallic cations which balance the electrovalence of the aluminum ions of the molecular sieve crystal structure.

In its most particularly preferred embodiment, the aforesaid zeolitic catalyst composition is in combination with a solid inorganic oxide diluent having a hydrocarbon cracking activity not quantitatively greater than the zeolitic molecular sieve component, said diluent carrying a hydrogenation-dehydrogenation agent and constituting from 25 to 75 weight percent of the overall composite catalyst on an anhydrous basis.

The zeolitic molecular sieve suitable for use in the catalyst composition of the present invention can be expressed in terms of moles of oxides as follows:

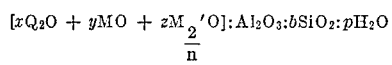

$$[xQ_2O + yMO + z\tfrac{M'_2}{n}O]:Al_2O_3:bSiO_2:pH_2O$$

wherein Q represents an alkali metal, preferably sodium, M represents a metal selected from the class consisting of calcium, barium, strontium and manganese and mixtures thereof; M' represents a metal selected from the group consisting of thorium and the rare earth elements having an atomic number of from 57 to 71 inclusive and mixtures thereof; $b$ has a value of from 2.3 to 3; $p$ can be any value from zero to about 9, $(x+y+z)$ has a value of from about 0.92 to about 1; $y$ has a value of at least 0.6, and preferably at least 0.75; $z$ has a value of from 0.04 to 0.30; and $n$ is a whole number which is the valence of the metal cation M'.

This crystalline zeolite can readily be prepared, using the procedures hereinafter detailed, from crystalline zeolite X. The preparation of zeolite X is described in U.S. Patent 2,882,244 issued Apr. 14, 1958 to Robert M. Milton. In general the processes for preparing zeolite X comprises forming an aqueous reaction mixture which in the aggregate contains the oxides $Na_2O$, $SiO_2$, $Al_2O_3$ and $H_2O$ in definite oxide mole ratios, digesting the mixture at an elevated temperature of the order of 100° C. and permitting the zeolite X crystals to precipitate. The crystals after isolation from the mother liquor are washed and dried in air.

Representative of reactants which serve as the source of silicon in the reaction mixture are sodium silicate, silica gels, silicic acid, aqueous colloidal silica sols and reactve amorphous solid silicas. Reactants which can serve as the source of aluminum are activated alumina, gamma alumina, alumina trihydrate, and sodium aluminate. Sodium hydroxide is advantageously employed as the source of sodium. Optimum proportions of reactants are to some degree dependent on the particular reactants employed. These proportions are well known in the art and can conveniently be referred to in U.S.P. 2,882,244 cited hereinbefore.

In order to replace the sodium cations of zeolite X with catalytically active cations, i.e., calcium, barium, strontium or manganese, and the rare earth metals, it is advantageous to proceed first with the calcium and/or manganese and/or barium and/or strontium replacement and thereafter to introduce the rare earth cations into the crystal structure. Although several techniques are well known to achieve an exchange of one metallic cation for another in a molecular sieve, in the case of calcium, barium, strontium and manganese a simple base-exchange technique using a suitable ionizable water soluble salt is entirely adequate. Base exchange is accomplished merely by contacting the zeolite X crystals with any one of an aqueous salt solution containing ions of calcium, barium, strontium or manganese such as those of calcium chloride, calcium nitrate, calcium bromide, calcium acetate, calcium benzoate, calcium bromate, calcium butyrate, calium chlorate, calcium chromate, calcium fluoride, calcium formate, calcium iodide, calcium permanganate, calcium nitrite, calcium hypophosphite, manganous nitrate, manganous acetate, manganous bromide, manganous chloride, manganous formate, manganous iodide, manganous lactate, manganous sulfate, manganous thiocyanate, barium nitrate, barium nitrite, barium hypophospite, barium chloride, barium bromide, strontium bromide, strontium formate, strontium nitrate, and stronium chloride, or mixtures thereof until at least 60 equivalent percent of the sodium cations remain replaced by calcium and/or manganese cations after the essential rare earth cations have been placed in the zeolite structure.

By similar techniques rare earth cations can be placed in the crystal structure of zeolite X or the calcium, strontium, barium, and/or manganese exchanged zeolite X. As in the case of calcium, barium strontium and manganese, rare earth metal cation exchange is accomplished by contacting the zeolite preferably after calcium, barium, strontium or manganese exchange, with an aqueous solution of an ionized rare earth salt solution for appropriate times and temperatures to replace at least 4 equivalent percent, and preferably 4 to 30 equivalent percent of the metal cations present in the zeolite structure.

It is contemplated that thorium and any of the readily available rare earth metal compounds may be employed for the above purpose. Generally, compounds will be used wherein the rare earth metal-containing ion is present in the cationic state. Representative compounds include nitrates, bromides, acetates, chlorides, iodides and sulfates of thorium or one or more of the rare earth metals including cerium, lanthanum, praseodymium, neodymium, samarium, europium, gadolinium, terbium, dysprosium, holmium, erbium, thulium, ytterbium, and lutetium. Naturally occurring rare earth minerals offer a convenient source for the rare earth metals. Monazite which contains cerium compounds as the principal rare earth metal compound present with lesser portions of thorium compounds and other rare earth compounds may be used as a suitable source of thorium and/or the rare earths. Mixtures of rare earth metal salts, for example, chlorides of lanthanum, cerium, praseodymium, neodymium, samarium and gadolinium available commercially at a relatively low cost may be effectively employed.

While water will ordinarily be the solvent in any of the base-exchange solutions used, other solvents, although generally less preferred, may be used; in which case, it will be realized that the above listings of representative metal compounds may be expanded. Thus, in addition to aqueous solutions, alcoholic solutions, etc. of the metal-containing compounds may be employed in producing the catalyst utilized in the present process. It will be understood that such metal compounds employed undergo ionization in the particular solvent used.

The concentration of metal compounds employed in the base-exchange solutions may vary depending on the conditions under which treatment is effected. In base-exchanging the alkali metal aluminosilicate with a solution of a metal compound generally the concentration of such compound is within the range of 1 to 30 percent by weight. The pH of such exchange solution is generally within the approximate range of 3.0 to 7.0 and, preferably, between about 4 and about 5.5.

The temperature at which base-exchange is effected may vary widely, generally ranging from room temperature to an elevated temperature at or near the boiling point of the treating solution. The volume of base-exchange solution employed in any instance may vary widely. Generally, however, an excess is employed and such excess is removed from contact with the crystalline aluminosilicate zeolite after a suitable period. It will be appreciated that the period of contact may vary widely depending on the temperature of the solution and the particular rare earth metal compounds employed. Thus, the time of contact may extend from a brief period of the order of a few hours for small particles to longer periods of the order of days for large pellets. The exchange may also be carried out with several batches of solution wherein contact time per batch may range from about ½ hour to 2 hours. Generally, the total time of contact will, depending on the various aforementioned factors, be within the range of ½ hour to 80 hours.

As will be readily appreciated by those skilled in the art base-exchange techniques cannot be directed specifically to the replacement of sodium cations in zeolite X when the zeolite contains cations other than sodium, introduced for example, by a previous base-exchange operation. Thus in the preparation of the zeolite catalyst of this invention if the base-exchange operation whereby calcium, barium, strontium or manganese cations are exchanged for sodium cations is carried out before the base-exchange with rare earth cations, the latter exchange will result in the replacement of some of the prior exchanged cations in addition to sodium cations by the rare earth cations. It is therefore necessary to initially replace more than 60 equivalent percent of the sodium cations of the zeolite with calcium, barium, strontium or manganese cations to provide for some replacement thereof by the subsequent rare earth cation base-exchange. The degree of excess base exchange employing calcium, barium, strontium or manganese cations over 60 equivalent percent will of course depend upon the desired final rare earth cation content within the permissible range for the catalyst product. As a corollary, if base-exchange with rare earth cations is carried out first and is thereafter followed by base-exchange with calcium, strontium, manganese, or barium cations an excess equivalent percent exchange of rare earth cations beyond that desired in the fiscal product must be effected. Since however rare earth cation sources are quite expensive, it is preferable to base-exchange with rare earth cations after exchanging with calcium, barium, magnesium or manganese.

Although, as stated hereinbefore, the calcium, barium, strontium or manganese cation content of the zeolite can suitably be as low as 60 equivalent percent and the rare earth cation content can be as low as 0.04 equivalent percent, it is particularly preferred that the monovalent alkali metal cation content be as low as possible. These monovalent cations not only do not contribute to the desired carbonium ion activity but are also believed to contribute to a loss of catalytic activity in service. Because the rare earth cations are both expensive and contribute primarily to the stability of the catalyst rather than to its reforming activity, it is advantageous that the monovalent cation content be reduced by replacement with calcium, barium, strontium or manganese cations. This means not only lowers the alkali metal cation content but also serves to maintain the zeolite structure as fully satisfied with metal cations as possible.

The essential hydrogenation-dehydrogenation activity of the present catalyst composition is attained by incorporating therein in finely dispersed catalytic amounts a noble metal of Group VIII of the Mendeleev Periodic Table, namely Pt, Pd, Os, Ir, Ru and Rh, or a mixture thereof. The preferred metals are platinum and palladium and the preferred amount of noble metal based on the weight of the activated, i.e. substantially anhydrous, zeolite is from about 0.05 to 2.0 weight percent, most preferably for 0.1 to 1.0 weight percent. Although the noble metal in amounts greater than 2.0 weight percent will also catalyze the essential dehydrogenation reaction, it has been found that the use of more than 2.0 percent does not substantially enhance catalytic activity and hence is superfluous as well as extremely expensive. The catalytically active noble metals can be dispersed upon the zeolite in their elemental state or as oxides or compounds thereof having catalytic properties.

The Group VIII noble metals can be introduced into the catalyst by any method which will result in the attainment of a highly dispersed catalytically active metal. Among the methods which have been successfully employed are (1) impregnation using an aqueous solution of a suitable metal compound followed by drying and thermal or chemical decomposition of the metal compound; (2) adsorption of a fluid decomposable compound of the metal followed by thermal or chemical decomposition of the metal compound; (3) cation exchange using an aqueous solution of a suitable metal compound in which the metal is in the cationic state with coordination complexing agents followed by thermal or chemical decomposition of the cationic complex. The metal loading techniques of methods (2) and (3) are preferred as the resulting products exhibit higher catalytic activity than those produced by method (1). The ion exchange techniques of method (3) is particularly advantageous.

The impregnation method (1) may be practiced in any way that will not destroy the essential structure of the crystalline zeolitic aluminosilicate. Impregnation differs from the other loading methods of this invention in that the metal is commonly in the anionic part of a water soluble compound and thus is only deposited on the external surfaces of the zeolite. In preparing the catalyst, a water soluble compound of the Group VIII metal, in an amount sufficient to contain the quantity of metal desired in the finally prepared catalyst product is dissolved in water and mixed with the dry crystalline zeolite after the zeolite has been washed free of any base-exchange solution with which the zeolite had previously been contacted. The elemental Group VIII metal is obtained when the impregnated zeolite is dried and heated to decompose the metal compound. Ordinarily this metal compound decomposition is carried out after the final catalyst composition has been tableted or otherwise shaped into the form in which it will be utilized in service. Reduction of the metal compound can be effected when necessary by heating in a hydrogen or other reducing atmosphere.

In order to effect the best distribution of the metal compound on the catalyst, the aqueous solution of the metal compound in the impregnation method should be as concentrated as practical. To this end the best results are obtained if at least some of the water contained in the inner pores of the zeolite has been removed prior to mixing with the impregnation solution. Such removal is effected by heating to about 125° C. Temperatures up to 200° C. may be employed for this drying and will effect a more complete removal of the water.

As stated above, the solution should be as concentrated as practical commensurate with achieving a uniform distribution of the metal compound on the zeolite. Practical quantities of water are in the range by weight of the zeolite from about 30 percent to 100 percent. Less than 30 percent will not wet zeolite thoroughly enough to distribute uniformly and over 100 percent will allow some solution to run-off with resultant loss of metal compound. About 60 weight percent has been found to produce good results. The thus impregnated zeolite may then be dried by heating to about 125° C. to evaporate enough of the water so that a powder product is obtained which may easily be pelletized in a conventional pellet press. The product may be then stored and the activation process requiring high temperature, and sometimes hydrogen treatment, may be effected when the pellets have been installed in the reaction chamber for use. The activation method is discussed hereinafter.

In accordance with method (2), the zeolite is first activated to remove any adsorbed water and then contacted with a fluid decomposable compound of the metal thereby adsorbing the compound into the sieve. Typical of such compounds are the metal carbonyls, metal alkyls, volatile metal halides and the like. The internally adsorbed compound is then reduced thermally or chemically to its elemental metal thus leaving an active metal uniformly dispersed throughout the internal adsorption region of the molecular sieve.

In the ion-exchange method (3) the noble metals are contained in the cationic portion of the compound in coordination complex form.

The ion-exchange may be practiced in standard fashion, i.e., the metal compound is dissolved in an excess of water in an amount calculated to obtain the desired amount of metal in the catalyst product. This solution is preferably then added to the zeolite with stirring and after a sufficient time has elapsed to allow the ion-exchange to take place the exchanged zeolite is separated by filtration. The ion-exchange of the active metal containing cations into the zeolite is substantially quantitative and the completeness of the exchange process can be detected by chemical tests for the metal in a sample of liquid from the exchanging solution. The filtered zeolite may then be washed to the extent necessary to remove any residual salts followed by drying to produce a pelletizable powder. Decomposition of the active metal containing cation is effected by heating to above 300° C. and preferably above 400° C.

The better catalytic activity shown by the metals introduced in the crystalline zeolite by ion-exchange rather than impregnation is believed due to the greater dispersion of the metal within the inner adsorption region of the crystalline zeolite achievable with ion-exchange techniques.

The zeolitic compositions at this stage of preparation are effective reforming catalysts and can be used directly after activation. It has been found however that a composition comprising any of these zeolitic catalysts and a porous inorganic oxide diluent having a hydrogenation agent thereon is more active as a reforming catalyst than the undiluted zeolitic composition. Of the final composition the diluent can constitute from about 25 to about 75 weight percent based on the total weight of diluent plus zeolite.

A wide variety of inorganic oxide diluent materials are known in the art—some of which exhibit hydrogenation activity per se. It will accordingly be understood that the expression "an inorganic diluent having a hydrogenation agent thereon" is meant to include both diluents which have no hydrogenation activity per se and carry a separate hydrogenation agent and those diluents which are per se hydrogenation catalysts.

Oxides suitable as diluents which of themselves exhibit hydrogenation activity are the oxides of the metals of Group VI of the Mendeleev Periodic Table of Elements. Representative of these metals are chromium, molybdenum, and tungsten.

It is preferred, however that the diluent material possess no pronounced catalytic activity per se, especially cracking activity. In all events, the diluent should not exhibit a greater quantitative degree of cracking activity than the zeolitic component of the overall reforming catalyst composition. Suitable oxides of this latter class are the aluminas, silicas, the oxide of metals of Groups III, IV–A and IV–B of the Mendeleev Periodic Table, and co-gels of silica and oxides of the metals of the Groups III, IV–A, and IV–B especially alumina, zirconia, titania, thoria and combinations thereof.

The zeolitic constituent of the catalyst composition can be combined with the metal oxide and/or silica gels by simple admixture of the zeolite crystals with the gel constituent while the latter is in a hydrous state such as in the form of a hydrosol, hydrogel, wet gelatinous precipitate or a mixture thereof, drying the mixture and forming suitable sized and shaped particles therefrom.

Aluminosilicate clays such as kaolin, attapulgite, sepiolite, polygarskite, bentonite, montmorillonite and the like when rendered in a pliant plastic-like condition by intimate admixture with water are also suitable diluent materials, particularly when said clays have not been acid washed to remove substantial quantities of alumina.

The most particularly preferred diluent material is alumina in a form which contains at least some amorphous alumina content. Typical of this type of diluent is the amorphous alumina produced by the ammonium gelation of aluminum nitrate, or other soluble aluminum salt, at a pH of above about 6. A commercially available alumina sold under the name of Filtrol Grade 90 and comprises principally boehmite, bayerite and amorphous alumina. Aluminas of this type are found to be particularly advantageous when it is desired to provide a hydrogenation catalyst such as platinum or palladium on the diluent by impregnation with a water soluble salt of the catalyst metal. When amorphous or partly amorphous the alumina possesses sufficient adsorptive activity to adsorb the metal salt from solution and distribute same widely and uniformly on its surface.

In addition to hydrogenation catalysts of the noble metals of Group VIII, i.e. the platinum-palladium group metals, other metals or metal compounds having hydrogenation activity can be employed. These include the metals and compounds of the metals of Groups I–B, IV–A, VI–B and VII–B of the Mendeleev Periodic Table of Elements, for example, chromium, nickel, molybdenum, tungsten, cobalt, silver, copper, rhenium, tin and lead. Where the salts or oxides of these metals are not water soluble they can be applied to the diluent in the form of finely divided powders with or without the aid of inert binder materials.

The concentration or relative proportion of hydrogenation agent on the diluent is not a narrowly critical factor. It has been found satisfactory to employ such an agent in amounts of from about 0.05 to about 20 weight percent (expressed as elemental metal) based on the diluent present on an anhydrous basis.

Activation of the catalyst compositions of this invention is accomplished by heating in air at temperatures within the range of 550° F. to about 1250° F., preferably at about 850° F. to about 1100° F. for from 2 to 8 hours. Activation conditions are not narrowly critical, however, and optimum values of time and temperature will depend somewhat on the particular composition being treated.

One of the characteristic properties of the catalyst compositions of the present invention is their unique immunity to the common catalyst inhibitors which frequently are present in petroleum feed stock. Immunity of the catalyst compositions to sulfur and nitrogen poisoning has been demonstrated by the absence of any measurable effect thereon when sulfur, in the form of thiophene, and nitrogen, in the form of quinoline, were introduced in the feed under reforming conditions in amounts as high as 200 parts per million respectively. Tolerances for sulfur with respect to most prior known catalysts are usually of the order of only about 25 parts per million and for nitrogen the tolerances are usually only about 10 parts per million. With the present catalysts, therefor, pretreating of the petroleum feed stock to lower the sulfur and/or nitrogen content is often not necessary. Up to 200 parts per million nitrogen can be tolerated by the catalysts of the present invention.

In carrying out the reforming process using the novel catalyst composition of this invention, conventional process conditions are employed. The process can employ the catalyst in a fixed bed, in a moving bed, or in a fluidized form. The overall operation can be batchwise or continuous. The principal operating variables in fixed bed catalytic reforming are temperature, pressure, space velocity and hydrogen/hydrocarbon ratio.

Temperature increases are most effective in increasing the octane number of the products through increasing both aromatization and hydrocracking reactions. Too high temperatures cause excessive hydrocracking which has an adverse effect on the reformate yield and on the life of the catalyst. In general, commercial reactor temperatures range from 850–975° F. (454–523° C.) and these values are suitable herein.

The weight hourly space velocity (WHSV) of the feed can be used to control reforming severity. Low space velocities increase hydrocracking, but have little effect on aromatization, since this reaction is quite rapid under normal operating conditions. Suitable space velocity values range from 0.05 to 10 with 1.0 to 5 being the preferred range.

High pressure tends to inhibit aromatization and promote hydrocracking. Low pressure represses hydrocracking and significantly increases aromatic formation. However, the lower hydrogen partial pressure causes extensive coking. It is preferred to use between 50–1000, preferably 200–600, p.s.i. with a hydrogen/hydrocarbon ratio of between 2–10, preferably between 3 and 6.

The hydrocarbon feed stocks subjected to reforming comprise mixtures of hydrocarbons and, more specifically, reformer hydrocarbon charge stocks such as petroleum distillates boiling within the range of about 100° F. to about 500° F., said range including naphthas, kerosene and gasoline. The gasoline fraction can be a full boiling range gasoline, but is preferably a selected fraction such as naphtha having an initial boiling point of between about 150° F. and about 250° F. and an end boiling point of between about 350° F. and 425° F.

The invention can be further understood by reference to the following examples which are intended only for purposes of illustration and are to be in no way limitative of the proper scope thereof as recited by the appended claims.

Example 1.—Ion exchange of Zeolite X with $BaCl_2$

To 369.0 grams of zeolite X (200 grams dry weight) having a composition 0.92 $Na_2O:Al_2O_3:2.54\ SiO_2$ was added 1.8 liters of demineralized water in a 3-liter, 3-necked flask. To the resulting slurry was added 644 grams of $BaCl_2$ and the mixture was thereafter heated to approximately 90° C. for 2 hours. The solid reaction product was filtered. Four additional hot $Ba^{+2}$ exchanges were given to the filter cake using fresh $BaCl_2$ and demineralized water. The cake was finally washed with demineralized water until free of chloride ion. The product was dried in air. Analysis showed the anhydrous product to have the following composition:

$$0.93\ BaO:0.01\ Na_2O:Al_2O_3:2.54\ SiO_2$$

Example 2.—Rare earth cation exchange of barium exchanged Zeolite X 173.43 grams (110.83 grams on an anhydrous basis) of the barium exchanged zeolite X prepared in Example 1 was slurried in 1.5 liters of demineralized water and thereto was added a solution of 13.42 grams of $DiCl_3 \cdot 7H_2O$. Agitation was continued for 4½ hours after which the slurry was filtered and the rare earth exchanged zeolite X product was washed free of chloride ion and then dried at 125° C. Analysis showed the following cation ratios:

Ba/Al _____ 76.5
Di/Al _____ 16.6
Na/Al _____ 0.4

$DiCl_3 \cdot 7H_2O$ represents didymium chloride heptahydrate. Didymium is a mixture of rare earth metals having the following typical proportions expressed in terms of oxides.

| | Weight percent |
|---|---|
| $Pr_2O_3$ | 8–12 |
| $La_2O_3$ | 40–45 |
| $Nd_2O_3$ | 32–37 |
| $Sm_2O_3$ | 3–6 |
| $Gd_2O_3$ | 2–4 |
| $Ce_2O_3$ | 1–2 |
| $Yb_2O_3$ | 0.2–1.0 |

Example 3.—Introduction of platinum by ion exchange 75 grams (anhydrous basis) of the product of Example 2 and 1 liter demineralized water measured into a 2 liter beaker. Slurry agitated, and to this constantly agitated slurry was added 150 ml. demineralized water containing 0.677 g. platinum tetramine chloride $(Pt(NH_3)_4Cl_2)$ dissolved therein. Slurry agitated additional hour, filtered, washed free of $Cl^-$ ion and dried at 125° C. The $Pt(NH_3)_4^{++}$ exchanges quantitatively into the zeolite.

Example 4.—Preparation of Alumina

Ingredients:
  Aluminum nitrate $Al(NO_3)_3 \cdot 9H_2O$
  Ammonium hydroxide $NH_4OH$ ($NH_3$=28–30%)
  Demineralized water Two liters demineralized water and 2.4 liters ammonium hydroxide measured into small glass water bath. Agitated momentarily. Added 1200 g. of aluminum nitrate rapidly to the ammonium hydroxide solution. Agitated for 10 minutes and filtered by suction. Upon filtration, the filter cake had appearance of a gel. Dried in forced draft oven at 250° C. for 5 hours and granulated through 200 mesh screen, analyses showed 79.4% solids.

Example 5.—Addition of hydrogenation component to the diluent and catalyst pellet preparation 68 g. (anhydrous basis) alumina from Example 4 and 1 liter demineralized water measured into a 2 liter beaker. To this constantly agitated slurry was added 250 ml. demineralized water containing 0.85 g. chloroplatinic acid ($H_2PtCl_6$) dissolved therein. The $PtCl_6^{--}$ is quantitatively taken up by the alumina. Slurry agitated additional hour, then added 68 g. (anhydrous basis) of the product from Example 4. The slurry was agitated for an additional 1½ hours, filtered, and the filter cake dried at 125° C. The dry cake was granulated through 30 mesh screen, and 2 wt. percent graphite was added and thoroughly physically mixed the catalyst powder and graphite. This product was then pelleted into ⅛" x ⅛" pellets with an average green crush strength of 15 lb. The pellets were fired in an air purged oven at a temperature of 650° C. which was reached in a period of 6 hours and held for 1½ hours. This firing effects removal of water from the zeolite and the alumina powder and decomposes the platinum-containing anions on the alumina to deposit the platinum in a highly dispersed state.

Example 6

The reforming activity of a representative catalyst of this invention is shown by the following data resulting from reforming a naphtha feed containing 15 volume percent aromatics with an API gravity of 50.5. The process conditions used were 300 p.s.i.; 900° F.; W.H.S.V. =2.0; hydrogen/hydrocarbon ratio=5:1. The catalyst composition consisted of 50 wt. percent zeolite X having a $SiO_2/Al_2O_3$ ratio of 2.5 and having about 78 equivalents of exchange capacity of didymium and loaded with 0.5 wt. percent platinum, the zeolite being in admixture with 50 wt. percent alumina carrying 0.5 wt. percent platinum. The data is shown in tabular form below:

| Hours on Stream | Pressure, P.s.i.g. | Reformate | | | | |
|---|---|---|---|---|---|---|
| | | Vol Percent Yield | Vol. Percent Aromatics | API° | RON | |
| | | | | | Clear | Plus 3 ml. TEL |
| 45 | 450 | 90.6 | 45.5 | 47.6 | 88.2 | 97.2 |
| 95 | 450 | 87.9 | 43.8 | 48.3 | 87.5 | 97.3 |
| 143 | 450 | 88.7 | 43.8 | 48.6 | 87.4 | 97.5 |

Example 7

The reforming activity of a barium cation-containing catalyst composition of this invention is shown by the following naphtha reforming process. The catalyst composition consisted of equal parts by weight of alumina carrying 0.5 wt. percent platinum and zeolite X having a $SiO_2/Al_2O_3$ ratio of 2.5; 77 equivalents of exchange capacity of barium; 15 equivalents of exchange capacity of didymium and loaded with 0.5 wt. percent platinum.

The apparatus used was a typical experimental high pressure test unit incorporating a stainless steel reactor 48″ in length and 1¾″ in diameter, surrounded by 1″ thick aluminum blocks and heated with a glass-col heating mantle. The catalyst zone in the reactor was 14″ long and contained 50 cc. of catalyst diluted to 250 cc. with 4 x 10 mesh quartz chips. The process conditions used were 300 p.s.i.; 900° F.; W.H.S.V.=2.0, with an $H_2$/HC ratio 5:1. The naphtha feed used contained 15 vol. percent aromatics with a 50.5 API gravity. The catalyst evaluation data given in tabular form below shows the catalyst to be stable and highly active throughout the test period of 150 hours.

| Hours on Stream | Avg. Temp. °F. | Vol. Percent Yield | Reformate | | R.O.N. | |
|---|---|---|---|---|---|---|
| | | | Aromatics | API° | Clear | Plus 3 ml. TEL |
| 4.5 | 897 | 85.6 | 51.2 | 45.3 | | |
| 21.0 | 902 | 88.8 | 53.1 | 44.7 | 86.5 | 96.7 |
| 43.0 | 900 | 89.5 | 48.3 | 45.4 | | |
| 49.0 | 901 | 89.3 | 50.7 | 45.5 | | |
| 71.0 | 903 | 90.8 | 45.7 | 45.6 | 85.3 | 95.9 |
| 94.0 | 903 | 90.8 | 46.8 | 45.6 | | |
| 101.0 | 902 | 89.0 | 46.3 | 45.7 | | |
| 125.0 | 903 | 89.8 | 46.1 | 46.0 | 84.4 | 95.8 |
| 141.0 | 904 | 90.2 | 44.8 | 46.2 | | |
| 148.0 | 901 | 90.1 | 46.7 | 46.0 | | |
| 171.0 | 901 | 90.2 | 42.7 | 46.1 | | |

Example 8

The stability imparted to the zeolitic catalysts of this invention by rare earth cations is clearly shown, by the retention of crystallinity after contact with steam. During normal cycling in a reforming process the catalyst becomes coked and must be subjected to oxidative regeneration. In the regeneration procedure steam is produced and contacts the catalyst at elevated temperatures. A good indication of the loss of crystallinity of the catalyst is the loss of ability to adsorb oxygen. For comparison, catalyst samples having 15 equivalent percent didymium and other samples without didymium were tableted, activated, and tested for $O_2$ adsorption. All of the samples were then subjected to steam at 550° C. for 1 hour, reactivated, and again tested for $O_2$ adsorption. In both cases the $O_2$ adsorption was measured at −196° C. and 75 mm. Hg pressure. The results are shown in tabular form below.

| Type of Catalyst | Percent $O^2$ Adsorption | |
|---|---|---|
| | Tableted | Tableted and Steamed |
| $Ca^{2+}X$ | 33.3 | 24.4 |
| $Ca^{2+}X$ (15% $Di^{3+}$) | 33.1 | 33.3 |
| $Sr^{2+}X$ | 29.3 | 19.9 |
| $Ba^{2+}X$ | 23.3 | 4.9 |
| $Ba^{2+}X$ (15% $Di^{3+}$) | 27.1 | 20.0 |

What is claimed is:

1. A catalyst composition comprising a crystalline zeolitic molecular sieve having a pore size sufficient to accept benzene and a composition expressed in terms of moles of oxides $$[xQ_2O + yMO + zM_2'O]:Al_2O_3:bSiO_2:pH_2O$$
$$\phantom{[xQ_2O + yMO + z}n$$

wherein Q represents an alkali metal; M represents a metal selected from the class consisting of calcium, strontium, barium and manganese and mixtures thereof; M′ represents a metal selected from the group consisting of thorium and the rare earth elements having an atomic number of from 57 to 71 inclusive and mixtures thereof; $b$ has a value of from 2.3 to 3; $p$ can be any value from zero to about 9, $(x+y+z)$ has a value of from about 0.92 to about 1; $y$ has a value of at least 0.6; $z$ has a value of from 0.04 to 0.30; and $n$ is a whole number which is the valence of the cation M′, said zeolite containing a hydrogenation-dehydrogenation agent.

2. The catalyst according to claim 1 which contains intimately in physical combination with the zeolite constituent an inorganic oxide diluent, said diluent carrying thereon a hydrogenation-dehydrogenation agent and constituting from about 25 to about 75 weight percent based on the total weight of the overall catalyst composition.

3. The catalyst according to claim 2 wherein the inorganic oxide comprises amorphous alumina, and the hydrogenation-dehydrogenation agent on said zeolite and said diluent is a metal of the Group VIII noble metal.

4. The catalyst according to claim 3 wherein the Group VIII noble metal is platinum.

5. The catalyst according to claim 4 wherein M is barium and $y$ has a value of at least 0.75.

6. The catalyst according to claim 4 wherein M is calcium and $y$ has a value of at least 0.75.

7. Process for reforming a hydrocarbon charge which comprises contacting same under reforming conditions with the catalyst of claim 1.

References Cited

UNITED STATES PATENTS

| 2,971,903 | 2/1961 | Kimberlin et al. | 208—119 |
| 2,971,904 | 2/1961 | Gladrow et al. | 208—135 |
| 3,121,754 | 2/1964 | Mattox et al. | 260—683.65 |
| 3,236,762 | 2/1966 | Rabo et al. | 260—683.65 |
| 3,236,903 | 2/1966 | Milton | 260—666 |
| 3,251,902 | 5/1966 | Garwood et al. | 208—135 |

HERBERT LEVINE, *Primary Examiner.*